Nov. 17, 1942.　　　H. P. SMITH　　　2,302,477
TRACTOR MOUNTED IMPLEMENT
Filed July 20, 1940　　　2 Sheets-Sheet 2
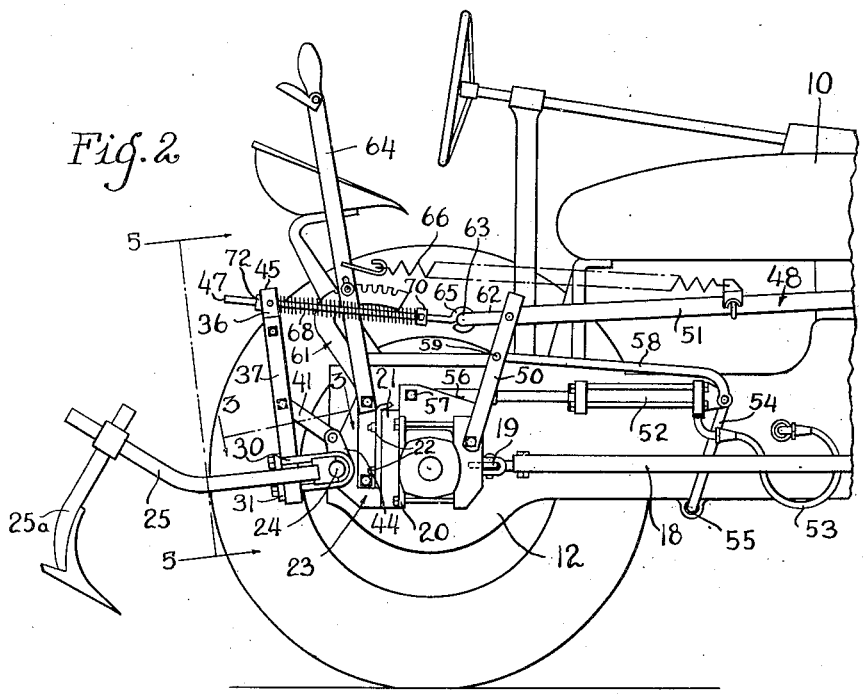
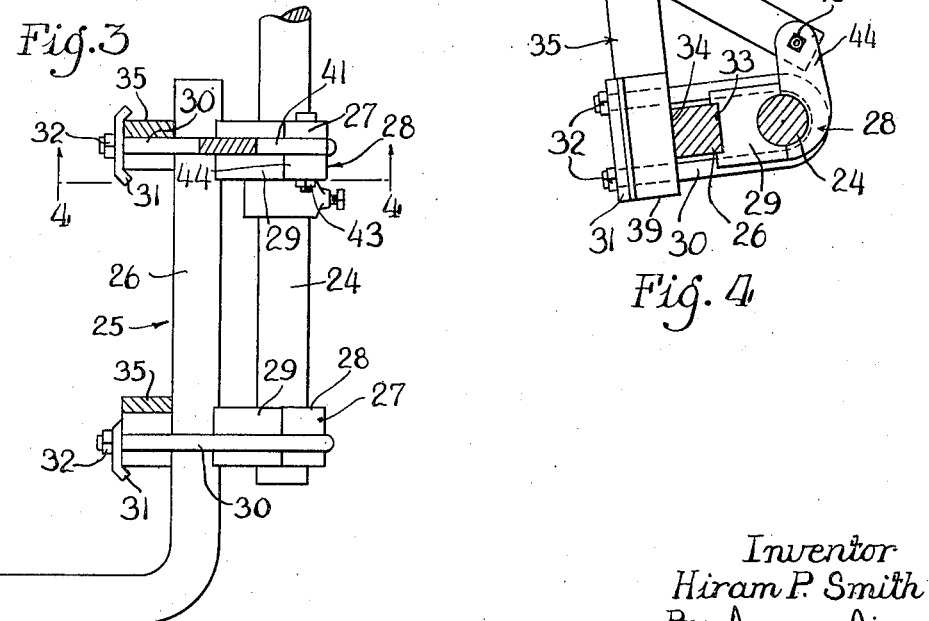
Inventor
Hiram P. Smith
By Paul C. Pippel
Atty Patented Nov. 17, 1942

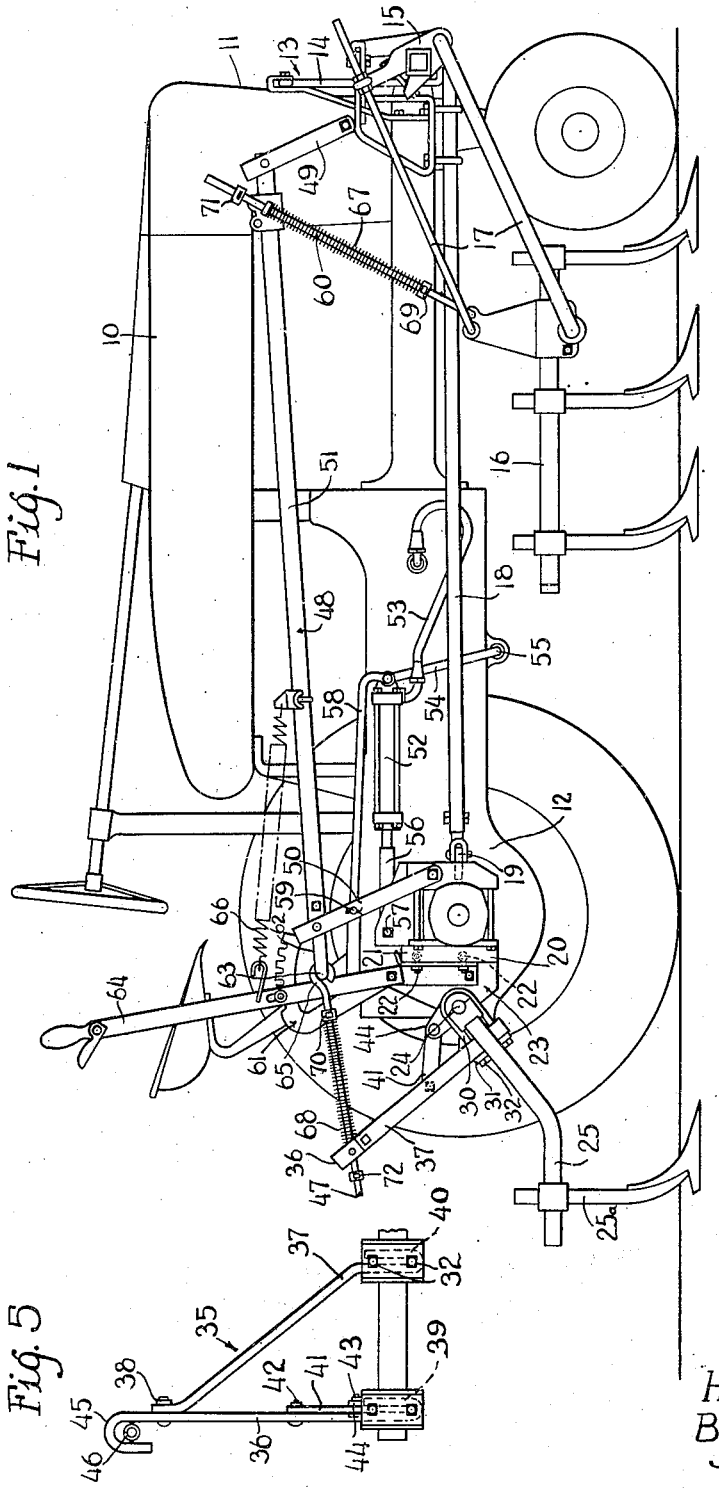

2,302,477

UNITED STATES PATENT OFFICE 2,302,477

TRACTOR MOUNTED IMPLEMENT

Hiram P. Smith, Canton, Ill., assignor to International Harvester Company, a corporation of New Jersey Application July 20, 1940, Serial No. 346,619

10 Claims. (Cl. 97—47)

This invention relates to tractor-mounted implements and more particularly to means for imparting force to the implements for the purpose of lifting the same from their ground-working position.

It has been usual heretofore to provide on a tractor, for the lifting of implements directly connected thereto, a rockable means having arms which extend out from the tractor for connection with lifting rods which in turn are connected to implements at a point removed from their point of connection with the tractor. Such an arrangement is not satisfactory for use with a movable means of a type disposed at the side of the tractor and movable in a fore and aft direction therealong and from which longitudinal movement of the lifting device is more available than vertical lifting movement.

It is, therefore, an object of the present invention to provide means adapted to be associated with a pivotally connected implement for receiving longitudinal movement and by which the pivotally connected implement will be lifted from its ground-working position.

It is another object of the invention to provide means common for the attachment of the implement rig and for the arm means to which lifting force is imparted, whereby the same clamping means serves to retain both of these implement parts when assembled.

According to the present invention, there has been connected to a pivoted implement structure, near to its point of connection with the tractor, an operating arm which extends vertically to a point above the rear axle of the tractor and to the end of which is connected linkage from power operable means located ahead of the rear axle of the tractor. When the power operable means is actuated, force will be imparted to the rigidly connected operating arm to thereby effect pivotal movement of the implement rig about its connection with the tractor. The operating arm is fixed to the implement rig by means of the same clamping bolt as is fixed the implement rig to a transversely extending shaft carried by the tractor. The operating arm is thereby made rigid with the bearing parts as well as with the implement rig, and is braced with respect to the same by a bracing member. The arm means at its point of connection with the bearing parts is formed to provide spaced portions between which passes the clamping bolt means serving to make rigid the various parts of the assembly.

For a better understanding of the invention, reference may be had to the following detailed description taken in connection with the accompanying drawings, in which:

Figure 1 is a side view in elevation of a tractor with one rear wheel removed and having attached thereto forward and rearward implements for operation by a common movable means, the rear rig disclosing the feature of the present invention;

Figure 2 shows a rear portion of a tractor and the rear rig in its lifted position;

Figure 3 is a detail view taken along the line 3—3 of Figure 2 and looking in the direction of the arrows thereof and showing in plan the assembly of the rig and operating arm with respect to the transverse shaft on the tractor;

Figure 4 is also a detail view, but in elevation, taken along the line 4—4 of Figure 3, and showing particularly well the bracing means between the operating arm and one of the bearing parts; and Figure 5 is a view taken along the line 5—5 of Figure 2, looking in the direction of the arrows thereof and showing in elevation the rear of the operating arm means.

Referring now to the figures, and particularly to Figures 1 and 2, there is shown a tractor 10 having a forward portion 11 and a rearward portion 12. On the forward portion there is connected a bracket structure 13 for supporting a pivotal suspension link 14 having pivoted on its lower end an implement supporting structure 15. This supporting structure 15 has connected thereto an implement rig structure 16 by means of a parallel link structure 17. This supporting structure 15 may extend entirely across the front of the tractor to support implement rig structures on the opposite side of the tractor. The supporting structure is also connected with the steering mechanism of the tractor so as to be moved laterally during the steering operation for effecting a magnified movement of the implement rigs to dodge plants while the tractor is traversing a field for the purpose of cultivating the same. Extending rearwardly from the supporting structure 15 is a push rod 18 connected to the rear axle structure at 19. This push rod maintains the bracket structure in a position forwardly of the tractor and supplies the necessary thrust to overcome the drag set up by the implements during their cultivating operation. Since the implement construction on the forward portion 11 of the tractor forms no part of the present invention, it is believed that the description presently to be given will be sufficient.

On the rear portion 12 of the tractor there is connected along the rear axle housing thereof a pair of quick tractor-attaching means 20. While only one of these attaching means 20 is shown in the figures, it will be understood, as is usual with tractor-mounted cultivators, that another one of these attaching means is located at the opposite side of the tractor. These attaching means 20 include a channel 21 with the opening to the rear of the tractor. This channel 21 has attaching bolts 22 for fixing to the tractor a bracket structure 23 adapted to carry a transversely extending shaft 24. This shaft 24 is made rigid with the bracket structure 23 and extends laterally across the rear of the tractor and thus, when the bracket structure 23 is made rigid with the tractor, this shaft 24 will also be made rigid with respect to the tractor. This shaft 24 is thus located to extend transversely from the central portion of the tractor and to thereby provide means for the attachment of implement parts. Since the shaft 24 is round, it serves as a bearing surface to which implement parts are pivotally connected.

Referring now particularly to Figures 3 and 4, it will be noted that the forward end of the rig structure 25 has a transversely extending portion 26. This transversely extending portion 26 of the rig structure 25 serves as the part adapted for connection with the transverse shaft 24, and, when connected, extends parallel therewith. The rig beam forming a part of the rig structure 25 is square in cross-section, and this square cross-section is extended throughout the transversely extending portion 26 thereof.

For the attachment of the transverse portion 26 to the shaft 24, there is provided a pair of bearings 27 located in spaced relation along the shaft 24. Each one of these bearing means includes bearing elements 28 and 29 hollowed in portions to fit about the shaft 24 in journaled relationship. Surrounding these bearing parts 28 and 29 is a U-bolt clamping means 30 extending rearwardly and including a clamping plate 31 and clamping nuts 32. On the rearward face of the clamping part 29 there is provided a channel portion 33 adapted to receive the transverse portion 26 of the rig structure 25.

As indicated at 34, there is inserted an operating arm 35 against which the clamping plates 31 may be brought to bear upon tightening of the clamping bolts 32. It will thus be noted that, when the clamping bolts 32 have been tightened, the entire assemblage of bearing parts, transverse portion 26, and operating arm means 35 has been made rigid and adapted for pivotal movement about the shaft 24 in their entirety.

Referring now particularly to Figure 5, it will be noted that the arm means includes a pair of vertically extending parts 36 and 37 connected together at their upper ends, as indicated at 38, and extending between the pair of clamping assemblies transversely spaced along the shaft 24. The lower ends of each of these parts 36 and 37 are bent back on themselves to provide spaced portions 39 and 40 between which the clamping U-bolt 30 passes. As a means for further bracing the operating arm 35, there is connected with the part 36 a brace 41. This bracing means is connected at 42, as seen in Figure 4, to the part 36, and at 43 to an extension 44 supplied for this purpose on the bearing part 28. The upper end of the part 36 of the operating arm 35 is turned over, as indicated at 45, to provide for the attachment of a trunnion 46, through which slides a link 47 adapted to be moved fore and aft by a movable device indicated generally at 48.

This movable device 48 includes a pair of levers 49 and 50 pivoted respectively on the forward bracket structure 15 at the forward part of the tractor, and on the tractor attaching means 20 at the rear of the tractor. The free ends of these levers 49 and 50 are entirely connected by a rod 51. Power is supplied to this operating arm by means of a fluid-actuating cylinder 52 adapted to be actuated by fluid supplied through a hose connection 53. The fluid cylinder 52 is supported at its forward end on a supporting link 54 pivoted at 55 to the tractor and its rearward end may be fitted within a sleeve 56, which is in turn connected to the tractor-attaching means 20 by a bolt 57. As the fluid-actuating device 52 is supplied with fluid, it will be extended and will carry with it the link 58, which is in turn connected to the lever 50, as indicated at 59. It should thus be apparent that the connecting rod 51 will be moved substantially in a fore and aft direction, and this same movement will be imparted to the link 47 connected at its rearward end to the arm 36. As the rod 51 moves forwardly, the implement structure 25 will be caused to pivot in a clockwise direction about the shaft 24, moving its tool 25a out of its ground-working position to a raised or transport position, as shown in Figure 2.

The forward implement structure 16 may be connected to the movable device 48 by means of a lifting rod 60 in the usual manner. As a means for adjusting the working depth of the implement, there is provided an adjustable manually operated stop mechanism 61, against which the rearward end of the movable device 48 abuts when the rigs are in their ground-working position. For this purpose the movable part or means 48 has a part 62 connected thereto, which has a laterally extending portion 63 for abutment with the lever 64 forming a part of the adjustable stop mechanism 61. This laterally extending portion 63 serves as means for the connection of the link 47 to the movable means 48. It will be noted that the link 47 has a portion 65 for this purpose. The movable device 48 is retained against the adjustable stop mechanism 61 by means of a spring 66 connected between the rod 51 and the lever 64.

In order that the rigs will be maintained in their ground-working position, there are further provided pressure springs 67 and 68 associated respectively with the lifting rods 60 and 47. These springs 67 and 68 are retained in their adjusted position respectively by collars 69 and 70. Stop collars 71 and 72 are provided respectively on the rods 60 and 47 for use during the lifting operation.

It should now be apparent that there has been provided an operating arm adapted to be fixed rigid with respect to the rig structure by the same means which is used for fixing of the same for pivotal connection with the tractor and that this operating arm, by being so connected, will serve as means whereby vertical movement of the rig structure may be imparted when the moving force for operating the same is taken from a movable device that imparts movement in a direction longitudinally along the tractor.

While various changes and alterations may be made in the detail construction of the present invention, it shall be understood that such changes shall be within the spirit and scope of the present invention as defined in the appended claims.

What is claimed is:

1. In combination, a tractor having a rear axle structure, a ground-working implement structure adapted to extend rearward of the rear axle structure, means for pivotally connecting the implement structure to the rear axle structure of the tractor for vertical movement to and from its ground-working position, means for moving the implement structure including an actuating means located ahead of the rear axle structure, a separable vertically extending arm, said pivotally connecting means for the implement structure including means for securing the separable arm to the implement structure, said separable arm extending vertically to a location above the rear axle structure, and means for connecting the upper end of the arm with the actuating means.

2. In combination, a frame, a tool-carrying beam, a separable operating arm, and means for pivotally connecting the tool-carrying beam to the frame including means for the attachment of the operating arm whereby the arm may be made rigid with the beam.

3. In combination, a frame, a tool-carrying beam, a separable operating arm, and means for pivotally connecting the tool-carrying beam to the frame including means for the attachment of the operating arm whereby the arm may be made rigid with the beam, and means on the frame and connected to the operating arm for effecting pivotal movement of the beam.

4. In combination, a frame, a bearing shaft carried by the frame, a tool-carrying beam, means for pivotally securing the beam to the shaft including bearing parts adapted to be fitted about the shaft, clamping bolt means for retaining the bearing parts and for the fixing of the beam to the parts, an operating arm adapted to be made rigid with the beam and bearing parts by the pivotal securing means, and said arm at its point of connection with the securing means having spaced portions between which the bolt means may pass.

5. In combination, a frame, a bearing shaft carried by the frame, a tool-carrying beam, means for pivotally securing the beam to the shaft including bearing parts adapted to be fitted about the shaft, a clamping bolt means for retaining the bearing parts and for the fixing of the beam to the parts, an operating arm adapted to be made rigid with the beam and bearing parts by the pivotal securing means, and said arm at its point of connection with the securing means being folded back on itself to provide spaced portions between which the bolt means may pass.

6. In combination, a frame, a bearing shaft connected to the frame, a tool-carrying beam, means for pivotally securing the beam to the shaft including bearing parts adapted to be fitted about the shaft, means for the engagement of the beam with one of the parts, and clamping elements serving to retain the fitted bearing parts about the shaft for rotative movement with respect thereto and for fixing the beam in its engagement with the one of the parts, and means serving as an operating arm fitted to be secured by the clamping elements to be rigid with the beam and with the fitted bearing parts.

7. In combination, a frame, a bearing shaft connected to the frame, a tool-carrying beam, means for pivotally securing the beam to the shaft including bearing parts adapted to be fitted about the shaft, means for the engagement of the beam with one of the parts, and clamping elements serving to retain the fitted bearing parts about the shaft for rotative movement with respect thereto and for fixing the beam in its engagement with the one of the parts, and means serving as an operating arm fitted to be secured by the clamping elements to be rigid with the beam and with the fitted bearing parts, and bracing means connected between the arm means at a point removed from its connection with the bearing parts and one of the bearing parts.

8. In combination, a frame, a laterally extending bearing shaft connected to the frame, a ground-working implement structure including a tool-carrying beam having a transversely extending portion, means for pivotally securing the beam to the rigidly connected shaft on the tractor including a pair of journal bearing means spaced along the shaft and each of the bearing means provided with parts fitted about the shaft and clamping elements serving to retain the fitted bearing parts and as well to retain the transversely extending portion of the beam rigid with the parts, and means serving as an operating arm extending between the spaced bearing means and fitted to be respectively secured by the clamping elements thereof to be made rigid thereby with the beam and with the fitted bearing parts.

9. In combination, a frame, a tool-carrying beam, a separable operating arm, and common means for pivotally connecting the tool-carrying beam to the frame and for attaching the operating arm to the tool-carrying beam.

10. In combination, a tractor having a rear axle structure, a ground-working implement structure adapted to extend rearwardly of the rear axle structure and including a tool-carrying beam, a bearing shaft on the rear axle structure, means for pivotally connecting the tool-carrying beam to the shaft including bearing parts adapted to be fitted about the shaft, clamping bolt means for retaining the bearing parts and for fixing the beam to the parts, an operating arm, said clamping bolt means serving to rigidly secure the operating arm to the ground-working implement structure, and means on the tractor connected to the operating arm for effecting vertical movement of the ground-working implement structure.

HIRAM P. SMITH.